May 5, 1953 M. HICGUET 2,637,545
PROCESS FOR THE MANUFACTURE OF MAGNESIA
AND CALCIUM CARBONATE
Filed Dec. 13, 1949 3 Sheets-Sheet 1

Inventor
Max Hicguet
by
Stevens Davis Miller & Mosher
his attorneys

May 5, 1953  M. HICGUET  2,637,545
PROCESS FOR THE MANUFACTURE OF MAGNESIA
AND CALCIUM CARBONATE
Filed Dec. 13, 1949  3 Sheets-Sheet 2
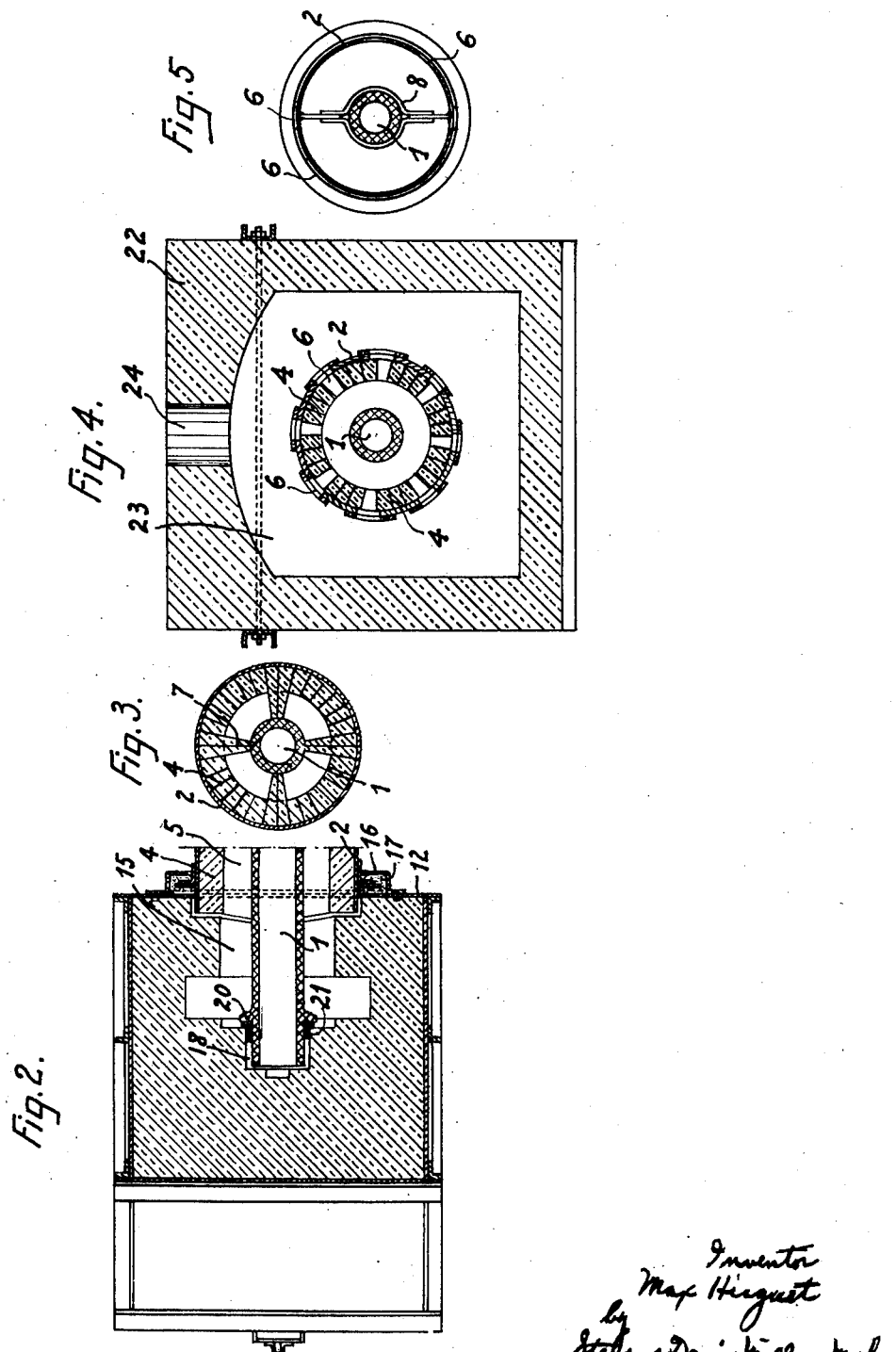
Inventor
Max Hicguet
by Stebbins, Davis, Miller & Mosher
his attorneys May 5, 1953
M. HICGUET
2,637,545
PROCESS FOR THE MANUFACTURE OF MAGNESIA
AND CALCIUM CARBONATE
Filed Dec. 13, 1949
3 Sheets-Sheet 3
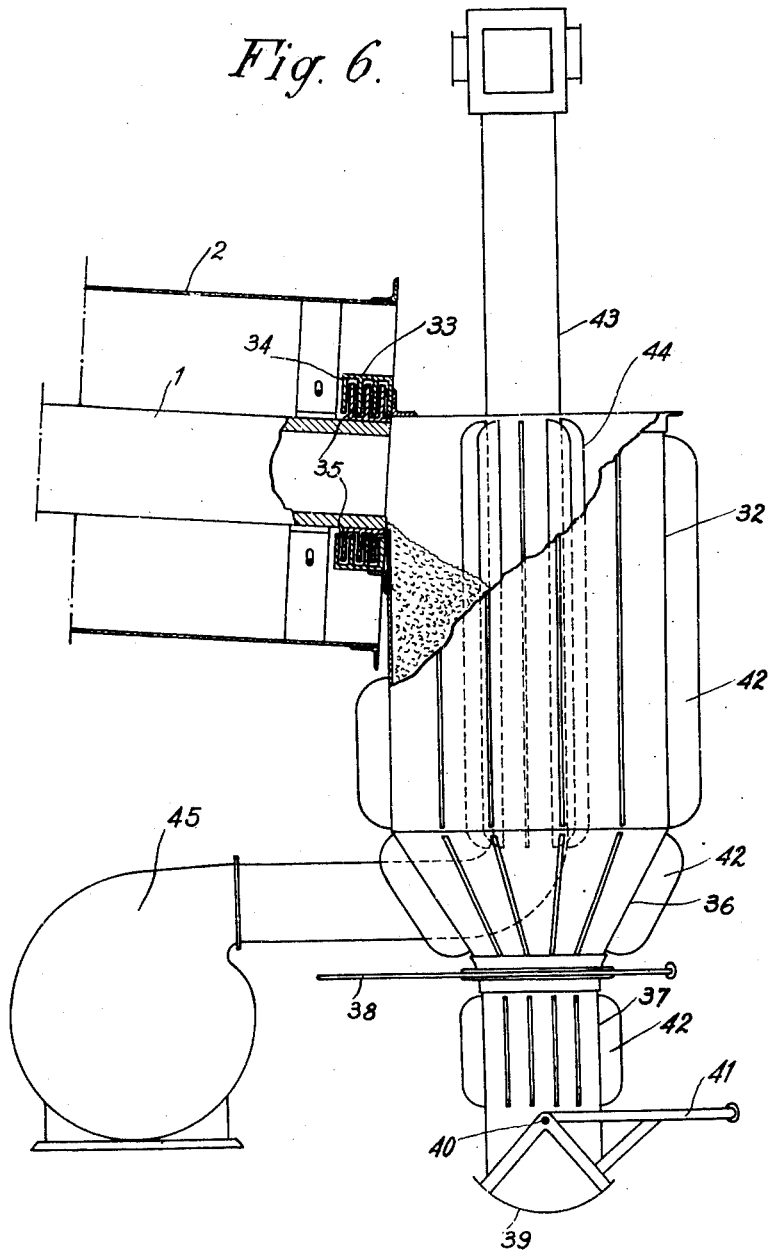

Patented May 5, 1953

2,637,545

UNITED STATES PATENT OFFICE 2,637,545

PROCESS FOR THE MANUFACTURE OF MAGNESIA AND CALCIUM CARBONATE

Max Hicguet, Paris, France

Application December 13, 1949, Serial No. 132,716
In France December 21, 1948

4 Claims. (Cl. 263—53)

Various processes have been proposed for obtaining mixtures of magnesia and calcium carbonate from natural minerals, particularly dolomite. All of them comprise calcining dolomite, but the conditions to be applied in effecting such a treatment have been the subject of numerous, various, and often contradictory proposals. Several temperature ranges have been advised, but they failed to secure the ideal object aimed at, viz. leaving the whole content of lime as calcium carbonate and the whole content of magnesia in uncarbonated condition.

It was acknowledged, thirty odd years ago, that it is desirable to cause a pressure of carbon dioxide to prevail over dolomite through the step of calcination at temperatures of the range 700–900° C., and for that purpose, to effect calcination in closed retorts having a pressure control device such as a gas discharge tube dipping into a water seal. It was admitted that under such conditions, calcium carbonate is not decomposed.

From a commercial standpoint, a serious drawback arose from the fact that production was effected by batches instead of being continuous. In addition thereto, in ignorance of the decarbonation and recarbonation phenomena as take place at certain temperatures, it happened that a product still containing free lime was prematurely discharged from the retort.

More recently, it has been proposed to calcine dolomite in an atmosphere having an increased carbon dioxide content but without working under an elevated pressure, so that the process could be carried out easily in continuous fashion in a rotary tubular furnace. However the product after calcination was rapidly withdrawn from the atmosphere laden with carbon dioxide, and then allowed to cool for the admitted purpose of avoiding adulteration of the product. From my own experiments, I have found that such a practice is detrimental to obtaining a product devoid of free lime.

As a matter of fact, I have found that on exposure to air, the loss of carbon dioxide during calcination of dolomite depends not only on the calcination temperature but also, to a large extent, on the duration of calcination; thus for example, the loss of carbon dioxide corresponding to complete conversion of magnesium carbonate to magnesia is obtained with certain species of dolomite either after a protracted maintainance at a temperature definitely below 700° C. or after a short period of keeping at a temperature definitely above 700° C.; furthermore in both instances, a considerable proportion of calcium carbonate is converted to lime. On the other hand, I have found that very different results are obtained when calcination is effected in a carbon dioxide atmosphere: firstly it is observed that carbon dioxide greatly delays production of lime without interfering with production of magnesia; secondly it is observed that within a relatively wide range of temperatures, calcination causes elective decarbonatation of the magnesium salt without substantial production of lime; anyway, any lime produced shows so far as it is still at a temperature higher than about 500° C. a marked propensity to recombine with carbon dioxide as soon as temperature falls by reason of lime being produced in statu nascendi, and eventually free lime disappears to the extent of being present by less than one percent by weight of the total mass. Thus samples calcined at a temperature of 770 and 780° C. respectively in an atmosphere of carbon dioxide showed a total lime content of 0.52% and 0.65% by weight respectively; in both cases, there was no lime on the surface. It is thus possible to obtain a fully satisfactory product, and by reason of working in the presence of carbon dioxide, it is unnecessary to seek a very great accuracy for the level of the maximum calcination temperature.

My invention comprises a process of the type in which a starting material that is a dolomite calcination product, possibly in hydrated form, is treated at a temperature of 500 to 800° C. in the presence of carbon dioxide; according to my invention the product after being subjected to the maximum temperature selected from the range 500–800° C. is allowed to cool or is cooled in the presence of carbon dioxide, it being critical to maintain the presence of carbon dioxide during cooling, at least until the temperature has not fallen below 500° C.

The step of cooling in the presence of carbon dioxide is critical because while at relatively low temperatures in the neighbourhood of ambient temperature, lime has but an extremely low propensity to recarbonate it shows a great propensity to do it at higher temperatures.

The main advantage of my process is that the free lime content of the product treated in the presence of carbon dioxide is very low and anyway any free lime therein lies in the core of the product bits, but not on the surface thereof, so that its presence is not detrimental.

My process may in particular be carried out according to two embodiments which are important from a commercial standpoint.

According to one of said embodiments, raw dolomite is calcined in a closed or substantially closed zone at a temperature which gradually increases up to about 700–800° C. then decreases from that level to less than 500° C.

In carrying out my process according to this first embodiment thereof, it is desirable to cause dolomite to move continuously through a zone which comprises in sequence a heating section and a cooling section and is arranged to prevent ingress of atmospheric air. For that purpose, a furnace of which an example will be described later on can be employed.

In practice it is desirable to bring dolomite as rapidly as possible to the maximum temperature selected from the range 500–800° C. Any possibility of conversion of calcium carbonate to free lime is thus reduced. Furthermore, it is preferred to select the maximum temperature in the range 700–800° C. because I have found that in a $CO_2$ atmosphere, $CO_2$ losses from dolomite at temperatures of said range depart but little from the temperature corresponding to thorough, elective decarbonatation of magnesium carbonate. On the contrary if dolomite in an atmosphere having a poor $CO_2$ content, $CO_2$ losses from dolomite rise abruptly from a temperature to another one, very proximate thereto, so that too narrow a range is available in industrial practice to obtain a product substantially devoid of free lime. I also prefer to maintain the maximum temperature for a short period so as further to restrict any possibility of production of free lime; a period of about 2 to 15 minutes is advisable. Finally as concerns cooling from the maximum temperature in a $CO_2$ atmosphere, down to 500–600° C., a period of about 5 to 30 minutes has been found desirable.

According to the second embodiment of the process according to my invention, the starting material is a dolomite product which in a known manner has been obtained by previously calcining dolomite to complete or substantially complete decarbonation, then hydrating and finally granulating the same, and the starting material is subjected to heat treatment as above set forth in the presence of carbon dioxide.

While according to the first embodiment, more carbon dioxide is released from the starting material than reabsorbed during the treatment and consequently as soon as a permanent state is reached no extraneous supply of carbon dioxide is required, it is necessary in the second embodiment to supply carbon dioxide from an extraneous source.

For that purpose, a convenient procedure is to employ combustion gas from which reactive components other than carbon dioxide may have been removed; gas obtained from decarbonatation of natural ores, particularly lime kiln gas, dolomite furnace gas and the like may also be employed; more particularly a plant for carrying out the process according to the first embodiment thereof may be combined with a plant for carrying out the same according to the second embodiment, so that excess carbon dioxide from the former provides for maintaining a carbon dioxide atmosphere in the latter and possibly provides a source of available heat.

Where combustion gases from the hearth provided for heating purposes, particularly gases produced from combustion of hydrocarbons, are employed as the sole or a supplemental source of carbon dioxide, or more generally where carbon dioxide accompanied with other gases or vapours is employed, it is desirable to take account of the dilution of carbon dioxide for example by nitrogen or water vapour, and to alter the rate of passage of solid starting material through the treatment zone accordingly; such a zone may in particular be provided in a furnace similar to that which is suitable for effecting the process according to the first embodiment thereof.

The process may be carried out with the aid of a furnace of which a non-limiting example is shown in the accompanying drawing.

Fig. 2 is a longitudinal horizontal section of the hearth portion of the furnace, along line II—II of Fig. 1.

Figs. 3 to 5 are cross-sections along lines III—III, IV—IV and V—V of Fig. 1.

Fig. 6 is an elevation, partly in section and on a larger scale, showing a modification of the end portion of the furnace.

Figure 1:
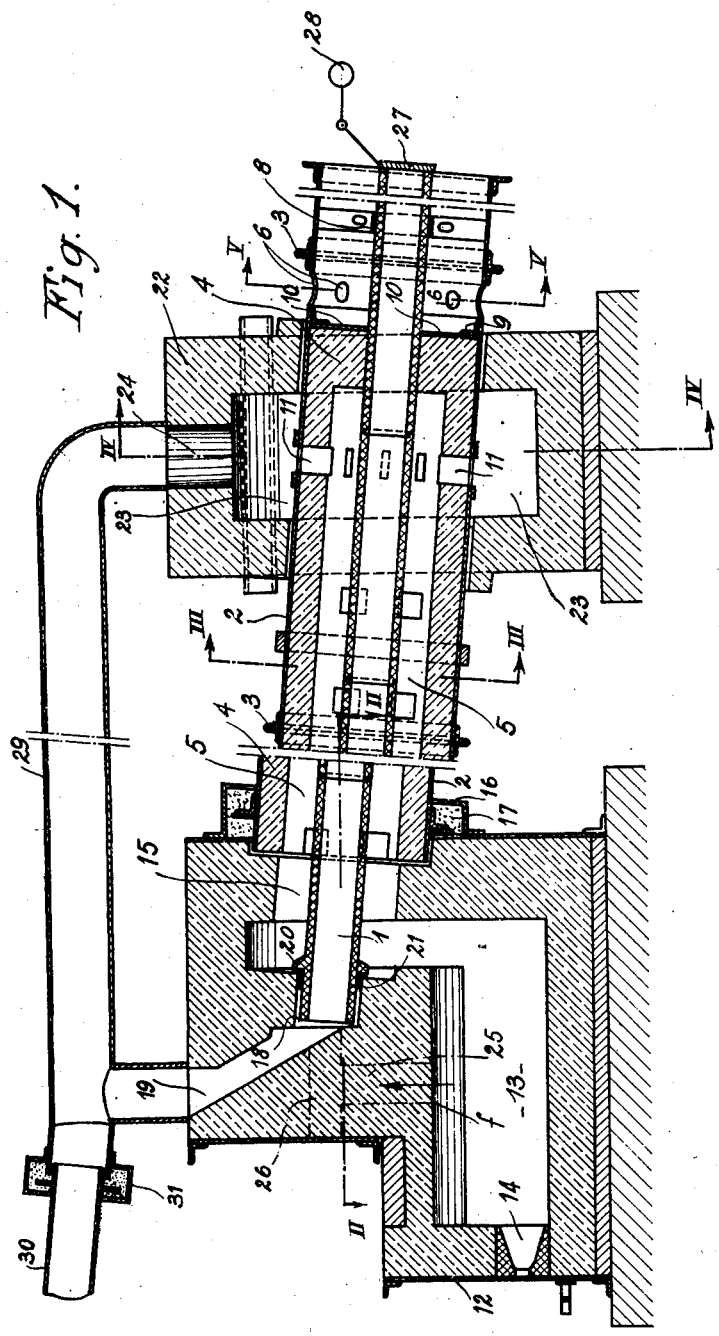
Fig. 1 is a longitudinal vertical section, partly diagrammatic and with parts broken away, of a furnace in accordance with this invention.

The furnace shown by way of example comprises a retort or tube 1 made of a refractory material having a high heat conductibility. It may be made of carborundum which meets that requirement by reason of its high heat conductibility, but more generally of any other refractory material, even refractory steel or cast-iron. Tube 1 is arranged in a metal casing 2, built up from adjacent sections assembled together through angle irons 3, and casing 3 is provided with an inner refractory lining 4 leaving an annular gas passage 5 between the inner wall of the lining and the outer periphery of tube 1. Lining 4 is co-extensive with only a portion of the length of casing 2; beyond the outer end of said lining and adjacent thereto, casing 2 or an extension thereof is formed with air passage apertures 6.

Referring more particularly to Fig. 3, lining 4 is provided at longitudinally spaced apart points, with inwardly projecting, radial members 7 acting as spacers to hold tube 1 at a suitable distance. Around tube 1 in the non-lined portion of casing 2, are rings 8 which are connected to the casing through radial projections welded thereto and play the same part as members 7 (Fig. 5). Separating the non-lined portion from the lined portion of casing 2, is a metal ring 9 combined with a refractory lining 10, and casing 2 as well as its annular lining 4 are apertured at 11 for egress of gas.

In the example illustrated by the drawing, casing 2 and tube 1 are supported in a slightly sloping position in two pillars one of which encloses a hearth while the other one is formed with a combustion gas exit flue or stack.

The first pillar is made of refractory materials enclosed in a metal shell 12 and has an inner chamber 13 providing a hearth, with an aperture 14 to accommodate one or several hydrocarbon (for example fuel-oil) burners; at the rear thereof, chamber 13 communicates with a combustion gas exit passage or manifold 15 into which casing 2 opens, said casing being supported according to this example in a metal ring 16 secured to the rear wall of the pillar. A packing ring 17 for example made of asbestos flock is held between ring 16, the rear wall of shell 12 and casing 2. Tube 1 extends frontwardly through manifold 15 into a passage 18 at the lower end of a shoot 19 for the materials to be treated; projecting from the outer periphery of tube 1 is a flange 20 which in combination with a packing 21 provide for gas-tightness so as to prevent access of combustion gases to shoot 19.

The second pillar 22 has an inclined aperture therethrough, in which casing 2 is rotatably accommodated; within pillar 22 is a combustion gas manifold or collecting chamber 23 in which apertures 11 open and which communicates with a gas exit flue 24. At its outer or material discharge end, tube 1 has a gate or valve 27 permanently biassed to closure (which has been diagrammatically illustrated by the showing of a counterweight 28) so as to restrict losses of carbon dioxide as well as prevent substantial ingress of atmospheric air.

Assuming that the furnace is employed for treating dolomite according to this invention, a hydrocarbon such as fuel-oil is burnt in chamber 13 at a rate which is controlled to secure the required temperature in tube 1, heating being effected by combustion gases which enter manifold 15, pass through annular space 5 and leave it through apertures 11, manifold 23 and flue 24. According to the first embodiment of my process, raw dolomite is dumped into shoot 19 and thence into tube 1, and the combination of tube 1 and casing 2 is rotated (through any suitable means, not shown). Dolomite is thus moved in tube 1 to the right, is calcined therein while releasing carbon dioxide which is cooled by air passing through the non-lined section of casing 2 according to arrow f. Carbon dioxide accumulates in tube 1 thus gradually driving air out of the same. As exemplified by valve 27, gas tight means may be provided at the discharge end of tube 1, substantially to prevent air ingress, and collecting means not shown may also be provided at the inlet end of tube 1 or at the upper part of shoot 19 to recover excess carbon dioxide.

For carrying out my process according to the second embodiment thereof, means for supplying carbon dioxide to tube 1 may be provided as illustrated in dash and dot lines on Fig. 1, in the form of a combustion gas by-pass; for that purpose, as shown, gas passages 25, 26 starting from hearth 13 and opening opposite the inlet of tube 1 may be provided in the first pillar.

The furnace an example of which has just been described, whether the furnace is rotary or stationary, can serve other purposes than the manufacture of products from dolomite according to my process as above set forth; thus it may be employed for treating materials which contain or may contain sulphurous, chlorinated, nitrous or carbonated compounds capable of releasing gases when heat treated, that might be more or less detrimental to conventional furnace walls at the treatment temperature. In some cases, such gases will be condensed and if they are polluted, the liquid obtained from condensation will be more or less contaminated with impurities which it is difficult to remove.

The furnace may also be employed for decarbonating natural carbonates which are simple or isomorphous with calcium carbonate, for example magnesium carbonate, dolomite which is a double calcium and magnesium carbonate, zinc carbonate and the like, as well as any organo-magnesium or organo-zinc compounds; it is particularly suitable for treating schists and shales containing sulphur, bitumens and other schistous compounds.

Calcination in the presence of carbon dioxide which requires indirect heating, is desirable only at temperatures higher than 500° C. or 600° C. according to the case. Consequently, the material to be treated may be brought to a temperature proximate to but lower than 500° C. or 600° C. through direct heating, particularly by means of combustion gas discharged through flue 24. For that purpose, in the example illustrated, I have shown a pipe 29 starting from flue 24 and opening into a rotary tube 30 through which the starting material to be treated is conveyed to shoot 19. The preheating tube 30 may be simply made of sheet iron and arranged to receive the material to be treated at the end thereof which is not shown, for example through a hopper. A gas-tightness device is shown at 31.

As a matter of fact that is no objection to heat raw dolomite or grains of decarbonated dolomite directly with combustion gases from ambient temperature to 500 or 600° C. Consequently owing to the provision of preheating tube 30, very hot gases leaving the furnace can be employed to heat dolomite to a temperature of 500–600° C. so that in the indirect heating furnace, a temperature increase of only about 200° C. is required.

Referring now to Fig. 6, a collecting vessel generally denoted by reference character 32 is provided at the discharge end of tube 1.

The collecting vessel comprises a sleeve 33 into which the discharge end of tube 1 projects and which, like that tube, is provided with rings 34 alternating with rings 35 on tube 1 to form a gas-tight maze seal. At the base thereof, the collecting vessel communicates through a hopper 36 with a tube 37 across which is a sliding valve 38; tube 37 is closed at its lower end by a swinging door 39 pivotally mounted at 40 and provided with an operating handle 41. The arrangement thus defines a lock that is filled with material by drawing out then pushing in slide valve 38 and can be emptied by swinging door 39 round, about its pivot 40, without causing any substantial volume of atmospheric air to enter the furnace.

The collecting vessel 32 is furthermore provided with inner and/or outer cooling means. According to the example shown, the collecting vessel 32 as well as tube 37 and hopper 36 have outer cooling fins 42; moreover a piping adapted to convey a cooling fluid passes through hopper 36 and collecting vessel 32. In the showing, it has been supposed that the piping comprises a tube 43 having outer cooling fins 44 and supplied with air from a fan 45.

What I claim is:

1. In a continuous process for producing from raw dolomite, a mixture of magnesium oxide and calcium carbonate substantially free from lime, the steps of rapidly heating raw dolomite to a temperature of the range 700–800° C. in a confined zone wherein the atmosphere substantially consists of carbon dioxide so as to cause calcination of said dolomite, maintaining said dolomite at said temperature in said zone in said atmosphere for a period of 2 to 15 minutes, then gradually cooling said dolomite in said confined zone still in said atmosphere to reach a temperature of 500° C. within 5 to 30 minutes, and thereafter withdrawing said dolomite from said confined zone.

2. In a continuous process for producing from raw dolomite, a mixture of magnesium oxide and calcium carbonate substantially free from lime, the steps of continuously passing raw dolomite through an atmosphere substantially consisting of carbon dioxide concurrently and in indirect heat exchange relationship with a heating fluid at a temperature above 800° C., so as rapidly to bring said dolomite to a temperature of the range 700–800° C., controlling the rate of passage and length of path to maintain said dolomite at said temperature of the range 700–800° C. for a period of 2 to 15 minutes, then passing the hot dolomite through said atmosphere out of heat exchange relationship with said heating fluid, controlling the rate of passage and length of path to cause said dolomite to be cooled down to a temperature below 500° C. still in said atmosphere within a period of 5 to 30 minutes, and passing said dolomite out of said atmosphere.

3. In a continuous process for producing a mixture of magnesium oxide and calcium carbonate by calcining raw dolomite to substantially complete decarbonation, hydrating and granulating the same, the steps of continuously passing the granular hydrated, dolomite calcination product through a first section of a treatment zone concurrently and in indirect heat exchange relationship with a heating fluid at a temperature higher than 800° C., so as rapidly to bring said product to a temperature of the range 700–800° C., the rate of passage and length of path being controlled to maintain said product at said temperature of said range for a period of 2 to 15 minutes before exit out of said first section, then passing said product through a second section of said zone out of heat exchange relationship with said heating fluid to cause said product to cool in said zone, the rate of passage and length of path being controlled to cause said dolomite to cool down to a temperature below 500° C. within a period of 5 to 30 minutes before exit of the product out said second section, and supplying carbon dioxide to said zone to maintain throughout the zone an atmosphere substantially consisting of carbon dioxide, then withdrawing said product from said zone.

4. In a continuous process for producing a mixture of magnesium oxide and calcium carbonate substantially free from lime by heating dolomite in a heat treatment zone to a temperature of the range 700–800° C. in an atmosphere substantially consisting of carbon dioxide until said dolomite is half-burned, the steps of cooling said half-burned dolomite from said temperature down to a temperature below 500° C. in said atmosphere in said zone within 5 to 30 minutes, and thereafter withdrawing said half-burned dolomite from said zone.

MAX HICGUET.

References Cited in the file of this patent

UNITED STATES PATENTS

| Number | Name | Date |
|---|---|---|
| 1,495,813 | Shaw et al. | May 27, 1924 |
| 1,679,486 | Means | Aug. 7, 1928 |
| 2,155,138 | MacIntire | Apr. 18, 1939 |
| 2,210,892 | Brandenburg | Aug. 13, 1940 |
| 2,359,792 | Rex | Oct. 10, 1944 |
| 2,373,749 | Elkington et al. | Apr. 17, 1945 |

FOREIGN PATENTS

| Number | Country | Date |
|---|---|---|
| 498,372 | Great Britain | Jan. 6, 1939 |

OTHER REFERENCES

Bureau of Mines, I. C. 7247 (August 1943), pages 5 and 6.